June 25, 1963

G. FÖRSTER 3,095,474

TELEVISION RECEIVER WITH CONTRAST CONTROL
AND AGC-CONTROLLED VIDEO AMPLIFIER

Filed May 29, 1959

INVENTOR
GERHARD FÖRSTER

BY Frank R. Trifari
AGENT

United States Patent Office 3,095,474
Patented June 25, 1963

3,095,474

TELEVISION RECEIVER WITH CONTRAST CONTROL AND AGC-CONTROLLED VIDEO AMPLIFIER

Gerhard Förster, Hamburg-Stellingen, Germany, assignor to North American Philips Company, Inc., New York, N.Y., a corporation of Delaware Filed May 29, 1959, Ser. No. 816,894
6 Claims. (Cl. 178—7.5)

Figure 1:
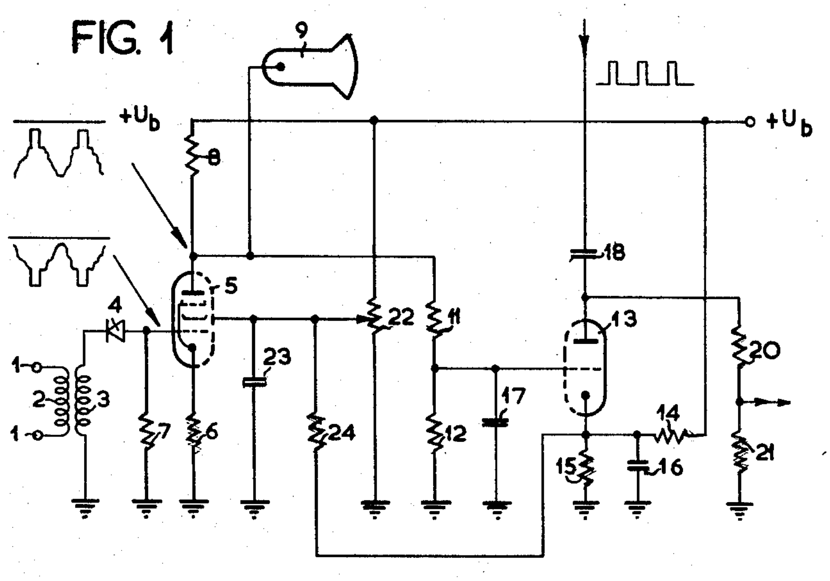

In a television receiver comprising a device for automatic gain control in order to keep the signal amplitude and the level of the peaks of the synchronizing pulses at the picture tube constant, the contrast is frequently controlled by acting upon the gain control, preferably by the variation of a resistor traversed by direct current, by means of which an auxiliary voltage is produced and fed, for example, to the video amplifying valve. This direct voltage varies the amplification or the control-range respectively of the video amplifying valve; in particular, when this amplifying valve is controlled by the video signal containing the initial direct-current component, the desired variation in the amplitude of the signal fed to the picture tube or to a different reproducing device is obtained so that the desired contrast variation, particularly the increase in maximum brightness (white level) is achieved.

With a television signal the control depends upon the amplitude of the synchronizing pulse peaks, since the value thereof is independent of the transmitted image signal. If the television signal contains the initial direct-current component there is a fixed relationship between the synchronizing pulse amplitude and the black level.

Such arrangements, which operate preferably with peak rectification, provide, as is known, in general no accurate control; there is yet always a certain variation in the controlled signal; from this variation the required control-voltage is derived. When the gain control is varied for contrast adjustment, also in this case the said small displacement of the pulse peaks is produced. For the pulse transmission and for the reproduction of the bright picture portions this is practically not essential. The variations of the black level also occurring may, however, have a very disturbing effect.

It is known that the eye has a logarithmic sensitivity so that small brightness variations in dark parts are highly perceptible. By small variations in the contrast control the darkest parts may change from black to grey or black may vary in the opposite direction so that also the lowest steps of grey seem to be black and the dark picture details get lost in these parts. It is therefore quite essential that the black level should be independent of the contrast control to the desired extent.

In a circuit arrangement of a television receiver comprising a device for the automatic gain control in order to keep the signal amplitude and the level of the peaks of the synchronizing pulse at the picture tube constant, in which contrast is adjusted by controlling the control range of an amplifying valve for the video signal, containing the direct-current component, by means of a variable resistor traversed by direct current, the said disadvantages are avoided and also the residual dependence of the black value upon the contrast control can be eliminated, if, in accordance with the invention, at least part of the direct voltage at the contrast resistor is fed to the gain control-circuit so that its variation operates in the same sense as the variation of the peaks of the synchronizing pulses, so that the black level of the picture tube is independent of the contrast control and is substantially constant.

Such a circuit arrangement therefore permits of obtaining an excellent black-level stabilisation. Under certain conditions, however, a complete compensation or an overcompensation may be used to provide a wanted other relationship between the signal amplitude and the background brightness.

It is known that, when the screen is struck by room light, an increase in brightness occurs so that the dark picture parts are illuminated. For a satisfactory reproduction the adjustment is to be such that the background brightness $H_o$ produced by the electron current in a picture tube is approximately equal to the screen brightness $H_r$ produced by the room light. This may be adjusted in a simple manner by increasing the background brightness $H_o$ to a value such that the line pattern can just no longer be perceived. Then the brightness of the spaces between the lines, illuminated only by room light is just approximately equal to the line brightness. With this adjustment the minimum brightness $H_m$ of the total image is approximately equal to the sum of the natural background brightness of the picture tube and of the brightness $H_r$ of the reflected room light.

But also the maximum brightness $H_n$ of the white level of the image is to be corrected in the event of a variation in the background brightness. Under the conditions of television the eye is capable of perceiving practically only a contrast range (ratio between maximum and minimum brightness) of about 30 to 50; about 30 to 35 distinguishable steps are obtained, when the brightness values of the steps differ by approximately 12%. For a satisfactory reproduction not only the background brightness is to be adapted to the room light conditions, but also the total contrast must remain approximately constant.

This is the case, when the ratio between the maximum brightness and twice the background brightness $2H_o$ is kept constant. This condition can also be fulfilled in a simple manner in accordance with the idea of the invention. In that case the circuit arrangement according to the invention is characterized in that at least part of the direct voltage at the contrast control resistor is fed to the control device so that its variation has an effect opposite that of the variation of the peaks of the synchronizing pulses and that the brightness value of the picture tube, corresponding to the black level increases with an increase in video voltage.

Figure 2:
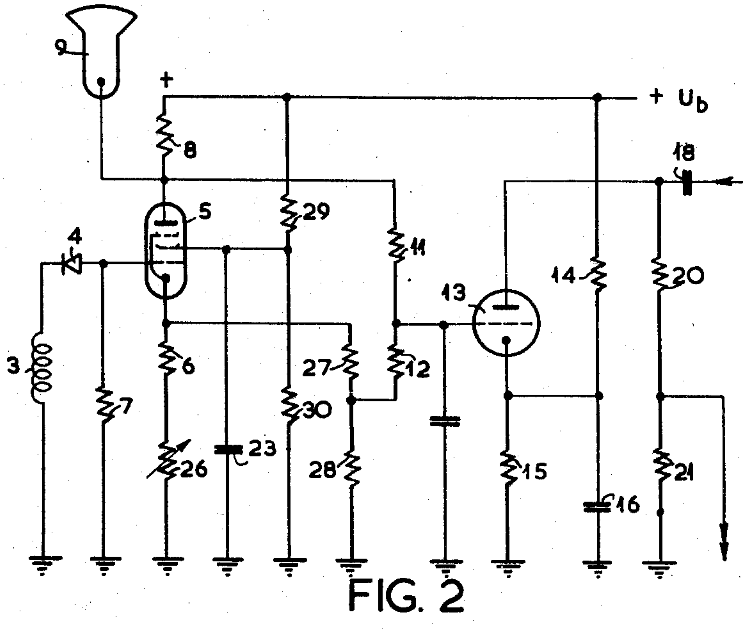

The invention will be described, by way of example, with reference to the drawing, which shows the video demodulator and a video amplifying valve together with an automatic gain control arrangement. In the drawing:

FIG. 1 is a circuit diagram of a video stage and automatic gain control stage of a television receiver, including means for compensating for changes of background brightness with variation of the contrast control, according to one embodiment of the invention; and FIG. 2 is a circuit diagram of a video stage and automatic gain control stage of a television receiver including another embodiment of the means for controlling the background brightness according to the invention.

As shown in FIG. 1 the intermediate frequency image signal oscillations of the type having the video signals negatively modulated on the intermediate frequency oscillations, are fed from the input terminals 1 to an inductor 2. This inductor is coupled with an inductor 3, of which one end is connected to earth and of which the other end is connected to the cathode of a demodulator diode 4. The anode of the diode 4 is connected to the control grid of a video amplifying valve 5, of which the cathode is connected to earth via a resistor of, for example, 33 ohms. Between the grid and the earth provision is furthermore made of a resistor 7 of, for example, 3K ohm, which serves, in particular, as a load for the rectifying circuit.

The anode of the valve 5 is connected via a resistor 8 of, for example, 3.3K ohm, to the positive terminal of the supply source $U_b$ of, for example, 220 v. The anode of the valve 5 controls the cathode of a picture tube 9.

At the first grid of the valve 5 occurs the image signal with negative-going synchronizing pulse peaks; at the anode these peaks are positive-going; their voltage is only little lower than the battery voltage. These positive-going pulses are fed to the control-grid of an amplifying valve 13 via a potentiometer connected between the anode of valve 5 and earth and consisting of the resistor 11 of, for example, 60K ohm and the resistor 12 of, for example, 10K ohm.

The cathode of valve 13 receives a positive bias voltage of, for example, about 25 v., via a potentiometer connected between the positive terminal of the supply source and earth and consisting of the resistor 14 of, for example, 220K ohm and the resistor 15 of, for example, 33K ohm. In order to avoid fluctuations of this bias voltage the resistor 15 is shunted by a capacitor 16 of, for example, 4μf. It may also be advantageous to connect a small capacitor 17 of, for example, 400 pf. between the grid and earth connection of the valve 13.

Positive-going synchronizing pulses are fed to the anode of valve 13 in known manner via a coupling capacitor 18 of, for example, 1000 pf. Between the anode of valve 13 and earth provision is made of the series connection of two resistors 20 and 21 of, for example, 100K ohm each, from the tapping of which is obtained the control-voltage for the aforesaid valves, particularly the intermediate-frequency valves.

In parallel with the supply source is furthermore connected a potentiometer 22 of, for example, 500K ohm, the sliding contact of which is connected to the screen grid of valve 5 and to earth via a capacitor 23 of, for example, 4 μf. By varying the screen grid voltage of valve 5, which is controlled substantially up to the cutting-off point by the video signal, the characteristic line is shifted with respect to the first available video voltage. Thus the amplitude of the synchronizing pulses at the anode of valve 5 and at the grid of valve 13 vary, particularly with respect to the threshold voltage of the cathode circuit. The valve 13 which is conductive during the anode pulses occurring simultaneously with the synchronizing pulses, then draws a higher or lower current, so that as is the case with a real variation in input signal, the control voltage produced is varied in a manner such that the video signal is increased or decreased to an extent such that the peaks of the synchronizing pulses attain again approximately the same value at the anode of the picture tube 9. The black level, however, is then shifted appreciably in a sense such that the background brightness increases materially with a higher video signal.

In accordance with the invention this can be avoided in that the screen grid voltage is fed to the cathode of the amplifying valve 13 via a resistor 24 of, for example, 3.85K ohm to the input circuit of the control-voltage device, in this case the cathode of the amplifying valve 13. If in the case of a lower video signal, the control grid of valve 13 is controlled to a higher positive value during the synchronizing pulses—in order to produce a strongly negative control voltage reducing the amplification—there occurs in this case, owing to the lower screen grid voltage, a slightly lower cathode voltage; the sense of the variation in the supplied auxiliary voltage is therefore the same with respect to the grid cathode path. The potentiometer consisting of the resistor 24 and particularly of the resistor 15 for the counter-voltage obtained from the screen grid voltage can be readily proportioned so that, upon a variation in the contrast adjustment by displacement of the sliding contact of the potentiometer 22, the black level in the picture tube 9 remains substantially the same.

It should be noted that, in order to reduce any effect of interferences contained in the television signal on the operation of the arrangement described above, the interference pulses separated out at a further point in the receiver can be fed, with a polarity opposite that of the interferences occurring in the television signal, to the said signal, for example, by feeding the separated interference pulses in a suitable manner also to the valve 13.

FIG. 2 shows an arrangement which is identical in principle and in which the amplification variation and hence the contrast adjustment of the video amplifying valve are obtained in that in the cathode circuit of the valve 5 is included a variable resistor 26 of, for example, 300 ohm. The voltage at the cathode of the valve 5 is fed via an otherwise earth-connected potentiometer 27, 28 of resistors of, for example, 5K ohm each, to the foot of the grid resistor 12. The screen grid of the valve 5 is then at a fixed potential by means of the potentiometer 29, 30. Since in the arrangement shown in FIG. 2, in contradistinction to that of FIG. 1, the direct voltage at the controlled resistor 29 increases when the signal amplitude decreases, the compensating auxiliary voltage of FIG. 2 is to be introduced with the same sense of variation as that of the amplitude of synchronizing pulses into the input circuit of valve 13 to correct the threshold voltage, i.e. into the grid circuit; according to FIG. 1 the introduction is into the cathode branch.

The correct voltage may, as an alternative, be fed directly to an electrode of the picture tube; if necessary potentiometers are to be included under certain conditions.

As stated above, it is efficient in many cases to vary the background brightness H*o* of the picture screen for the reproduction of the black level in accordance with the room brightness H*r* and also to adapt the amplitude of the video signal so that with a higher background brightness also the maximum brightness $H_m$ for the white level is raised, preferably so that the ratio between maximum brightness and double the background brightness is kept substantially constant. To this end, in accordance with the invention, in an arrangement of the said kind at least part of the direct voltage occurring across the contrast control resistor is fed to the control circuit so that its variation has an effect opposite that of the variation in the peaks of the synchronizing pulses.

It is evident that also an arrangement not having sufficient stability may be used. By incomplete or excessive compensation e.g. a desired, slight black level dependency upon the adjusted amplification is obtained. To this end, referring to FIG. 1 for example, the value of resistor 24 had to be slightly higher, for example, 5M ohm.

The same effect of an arrangement according to the invention is, of course, also obtained by using other amplifying elements, for example, transistors or a plurality of video amplifying stages. In this case of course, phase inversion, if any, is to be taken into account. If, in this case, the compensation required a higher voltage variation than the amplification variation or the shift of the characteristic curve (for contrast variation), use is to be made of an auxiliary potentiometer, from which the required partial voltages and their variations can be obtained by voltage division.

What is claimed is:

1. A television receiver comprising an amplifying device having an input circuit and an output circuit, a source of television signals having video signals negatively modulated on high frequency oscillations, means for demodulating said television signals to provide video signals having a direct current component, means applying said video signals with said direct current component to said input circuit, an image reproducing device, means connecting said output circuit to said image reproducing device, gain control means connected to said output circuit for maintaining the level of peak values of said video signals in said output circuit constant, means for varying the characteristics of said amplifying device to control the contrast of images on said reproducing device, said last-mentioned means providing a direct voltage having a value dependent upon the contrast of said image, and means applying said direct voltage to said gain control means to control the level at which said peak values of said video signals are maintained.

2. A television receiver comprising an amplifying device having an input circuit and an output circuit, a source of television signals having video signals negatively modulated on high frequency oscillations, means for demodulating said television signals to provide video signals having a direct current component, means applying said video signals with said direct current component to said input circuit, an image reproducing device, means connecting said output circuit to said image reproducing device, said signals having a black level and synchronizing peaks, gain control means connected to said output circuit for maintaining the direct voltage level of said synchronizing peaks in said output circuit with variations in the amplitude of said signals, means for varying the characteristics of said amplifier device to control the contrast of images reproduced by said image reproducing device, said characteristic varying means providing a direct voltage dependent upon the desired contrast of said image, and means applying said direct voltage to said gain control means to vary said direct voltage level in response to said contrast of said image.

3. A television receiver comprising a first amplifying device having an input circuit and an output circuit, a source of television signals having video signals negatively modulated on high frequency oscillations, means for demodulating said television signals to provide video signals having a direct current component, a black level, and synchronizing peaks, means applying said video signals to said input circuit, an image reproducing device having a control electrode, means connecting said output circuit to said control electrode, means for providing a control voltage, means connecting said output circuit to said control voltage providing means, means for varying the characteristics of said amplifying device to control the contrast of images produced by said image reproducing device, said characteristic varying means providing a direct voltage dependent upon the desired contrast of said images, and means applying said direct voltage to said control voltage providing means whereby changes in said control voltage due to variation of the level of said synchronizing peaks with adjustment of contrast are in the same sense as changes in said control voltage due to variation of said direct voltage with adjustment of contrast.

4. A television receiver comprising a first amplifying device having an input circuit and an output circuit, a source of television signals having video signals negatively modulated on high frequency oscillations, means for demodulating said television signals to provide video signals having a direct current component, means applying said video signals with said direct current component to said input circuit, said video signals having a black level and synchroizing peaks, an image reproducing device having a control electrode, means connecting said output circuit to said control electrode, an automatic gain control circuit for providing a control voltage, said gain control circuit comprising a second normally nonconducting amplifying device, means for rendering said second amplifying device conductive during said peaks, means connecting said output circuit to said second amplifying device to control the current flow therethrough, means for varying the characteristics of said first amplifying device to control the contrast of images reproduced by said image reproducing device, said characteristic varying means providing a voltage dependent upon the desired contrast of said images, and means applying said direct voltage to said second amplifying device whereby variations of said direct voltage with contrast and variations of the direct voltage level of said synchronizing peaks with changes in contrast effect a variation of said control voltage in the same sense.

5. A television receiver comprising a first electron discharge device having in the order named a cathode, a control electrode, a screen electrode, and an anode, a source of television signals having video signals negatively modulated on high frequency oscillations, means for demodulating said television signals to provide video signals having a direct current component, means applying said video signals with said direct current component between said control electrode and cathode, said video signal having synchronizing peaks, an image reproducing device, means connecting said anode to said image reproducing device, a second electron discharge device having a cathode, a control grid, and an anode, means connected between the anode and cathode of said second discharge device for rendering said second discharge device conductive only during said synchronizing peaks, output circuit means connected to the anode of said second discharge device for providing a control voltage, means biasing the cathode of said second discharge device, means connecting the anode of said first discharge device to said control grid, means providing an adjustable direct voltage to said screen electrode to vary the contrast of the image on said image reproducing device, and means applying said direct voltage between the cathode of said second discharge device and said control grid.

6. A television receiver comprising a first electron discharge device having a cathode, a control electrode, and an output electrode, a source of television signals having video signals negatively modulated on high frequency oscillations, means for demodulating said television signals to provide video signals having a direct current component, means applying said video signals having a direct current component between said cathode and control electrode, said video signal having periodic synchronizing peaks, an image reproducing device, means connecting said output electrode to said image reproducing device, a second electron discharge device having a cathode, a control grid, and an anode, means connected between the anode and cathode of said second discharge device for rendering said second discharge device conductive only during said synchronizing peaks, output circuit means connected to said anode for providing a control voltage, means connecting said output electrode to said control grid whereby the magnitude of said control voltage is dependent upon the direct voltage level of said synchronizing peaks, variable resistance means connected in series with the cathode of said first discharge device to vary the contrast of the image on said image reproducing device, and means applying a portion of the cathode voltage of said first discharge device between said control grid and the cathode of said second discharge device.

References Cited in the file of this patent

UNITED STATES PATENTS

| | | |
|---|---|---|
| 2,803,700 | Kroger | Aug. 20, 1957 |
| 2,820,093 | Berkhout | Jan. 14, 1958 |
| 2,832,822 | Rogers | Apr. 29, 1958 |
| 2,845,487 | Massman | July 29, 1958 |
| 2,855,458 | Rogers | Oct. 7, 1958 |
| 2,865,991 | Risner | Dec. 23, 1958 |
| 2,871,288 | Thomas | Jan. 27, 1959 |
| 2,885,473 | Kraft | May 5, 1959 |
| 2,921,130 | Jones | Jan. 12, 1960 |
| 2,927,156 | Jones | Mar. 1, 1960 |
| 2,978,539 | Fisher | Apr. 4, 1961 |